(12) United States Patent
Xu et al.

(10) Patent No.: US 12,102,873 B2
(45) Date of Patent: Oct. 1, 2024

(54) METHOD AND APPARATUS FOR FLEXIBLE LOCAL TRACKING

(71) Applicant: Huawei Technologies Co., Ltd., Guangdong (CN)

(72) Inventors: Qiang Xu, Richmond Hill (CA); Wei Li, Richmond Hill (CA); Zhe Liu, Richmond Hill (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 547 days.

(21) Appl. No.: 17/343,410

(22) Filed: Jun. 9, 2021

(65) Prior Publication Data

US 2022/0395724 A1    Dec. 15, 2022

(51) Int. Cl.
*A63B 24/00*      (2006.01)
*G01S 5/02*       (2010.01)
(Continued)

(52) U.S. Cl.
CPC ...... *A63B 24/0021* (2013.01); *G01S 5/02213* (2020.05); *G01S 5/0268* (2013.01);
(Continued)

(58) Field of Classification Search
CPC ............ A63B 24/0021; A63B 2102/16; A63B 2024/0025–0034; A63B 2220/12; A63B 2220/13; A63B 2220/836; A63B 2225/50; G01S 5/0036; G01S 5/0258; G01S 5/04; G01S 5/02213; G01S 5/0268; G01S 5/0284; G01S 5/0289; H04W 4/021; H04W 4/023; H04W 4/026; H04W 4/029; H04W 76/10
See application file for complete search history.

(56) References Cited

U.S. PATENT DOCUMENTS 6,270,433 B1 *  8/2001  Orenstein ............. G01S 13/878
                                                         473/467
8,791,860 B2 *  7/2014  Edelhaeusser ........ G01S 5/0278
                                                         342/451
(Continued)

FOREIGN PATENT DOCUMENTS

CN    103201645 A    7/2013
CN    103443746 A    12/2013
(Continued)

OTHER PUBLICATIONS

Actofit, "Badminton Tracker", https://web.archive.org/web/20201025024635/https://actofit.com/product/badminton-tracker/, retrieved on Jan. 10, 2024, 9 Pages.
(Continued)

*Primary Examiner* — Cassi J Galt
(74) *Attorney, Agent, or Firm* — Slater Matsil, LLP (57) ABSTRACT

There is provided a method and apparatus for tracking a device. The tracked device may be a wearable device worn by a user participating in an athletic activity. An anchor device is positioned with respect to a playing area and receives signals from the tracked device. The anchor device estimates the position of the tracked device by measuring a distance and direction of the signal, and decodes the signal to obtain measurements taken by the tracked device. The position and the measurements are combined to produce tracking data for the device.

21 Claims, 7 Drawing Sheets

(51) Int. Cl.
*H04W 4/02* (2018.01)
*H04W 4/029* (2018.01)
*H04W 76/10* (2018.01)
*A63B 102/16* (2015.01)

(52) U.S. Cl.
CPC ........... *G01S 5/0284* (2013.01); *H04W 4/023* (2013.01); *H04W 4/026* (2013.01); *H04W 4/029* (2018.02); *H04W 76/10* (2018.02); *A63B 2024/0034* (2013.01); *A63B 2102/16* (2015.10); *A63B 2220/13* (2013.01); *A63B 2220/836* (2013.01); *A63B 2225/50* (2013.01)

(56) References Cited

U.S. PATENT DOCUMENTS

| | | | |
|---|---|---|---|
| 9,724,578 | B2 | 8/2017 | Zhao et al. |
| 10,448,214 | B1* | 10/2019 | Jarvis ..................... H04W 4/029 |
| 10,742,864 | B2 | 8/2020 | Khazanov et al. |
| 10,758,807 | B2 | 9/2020 | Shachar et al. |
| 10,953,279 | B2* | 3/2021 | Lyske ................ A63B 24/0021 |
| 11,516,621 | B2* | 11/2022 | Al-kadi ..................... G01S 3/46 |
| 2006/0061469 | A1* | 3/2006 | Jaeger ................... G01S 5/0294 |
| | | | 340/539.13 |
| 2017/0272906 | A1* | 9/2017 | Kerai ..................... H04W 12/06 |

FOREIGN PATENT DOCUMENTS

| | | |
|---|---|---|
| CN | 108537726 A | 9/2018 |
| CN | 110726971 A | 1/2020 |
| CN | 111741432 A | 10/2020 |
| CN | 111815672 A | 10/2020 |
| CN | 112577481 A | 3/2021 |
| CN | 112630803 A | 4/2021 |
| ES | 2680068 A1 | 9/2018 |
| WO | 2019043568 A1 | 3/2019 |

OTHER PUBLICATIONS

"The Wayback Machine", https://web.archive.org/web/20201202155136/https://playsight.com/automated-production/, retrieved on Jan. 10, 2024, 3 Pages.

Zepp, "You Play. We Track.", https://web.archive.org/web/20210907174523/http://www.zepplabs.com/en-us/tennis/match-tracking/, retrieved on Jan. 10, 2024, 9 Pages.

* cited by examiner

METHOD AND APPARATUS FOR FLEXIBLE LOCAL TRACKING

The present application is the first application for the present disclosure.

FIELD OF THE DISCLOSURE

The present disclosure relates to tracking the position of objects. Specifically, the present disclosure is directed to a method and apparatus for providing flexible tracking of a local object.

BACKGROUND

Object tracking is used for tracking the movements of athletes, including the movement of body parts such as heads or hands, performing a physical activity. For sports professionals, the object tracking is used to record and analyze their training, while for amateurs, tracking is used to improve their technique and avoid injuries, as well as to provide a general understanding of their exercise.

However, existing object tracking techniques are expensive and lack the flexibility needed for widespread adoption. In particular, existing solutions may require complex and time-consuming setup in order to function properly. For example, the solutions may need sensors to be positioned at a precise location, or that sensors be calibrated before use, requiring trained technicians to operate.

Other systems may use sensors that are built-in sporting equipment. While such systems are easier to use, they are restricted to the sport for which the sporting equipment in question is designed.

Some prior art solutions use a camera-based tracking system for professional sport tracking, such as a plurality of mounted cameras aimed towards a playing surface. The data captured by the cameras may then be processed at a central server to produce three-dimensional tracking of the objects on the playing surface.

Such a system is suited to large scale commercial operations in a fixed location, however due to its complexity and cost, it is inadequate for everyday use by individuals.

Other systems, include a tracker device as part of a tennis racket or a badminton racket, respectively. This allows a user to track his movement on any playing surface without installing a complex array of sensors beforehand. However, such systems only provide relative tracking and not absolute tracking, can only be used in their respective sports, and require the users to use a specific racquet.

Absolute tracking is tracking of an object's actual position for example with respect to a playing surface. Relative tracking, in contrast, only provides information on the direction and speed of the tracked object but does not provide information on the object's position.

A playing area, or a playing surface, is the area in which the tracked devices will be tracked. It may be a basketball court, a football pitch, a ping pong table, a tennis court, a badminton court, or a skating rink amongst others. In general, a playing area or playing surface is the area where the tracked activity is to be performed.

SUMMARY

The present disclosure provides an improved method and apparatus for object tracking. Different implementations described herein may be used in combination with any other implementations or individually.

In a first aspect, there is provided a method for tracking a tracked device. A user equipment, acting as a first anchor device, and determines an anchor position and an anchor orientation of the user equipment. The user equipment then establishes a connection with the tracked device, and receives a signal from the tracked device. The signal is then used to estimate a relative position of the tracked device and an absolute position of the tracked device is computed from the relative position of the tracked device, the anchor orientation, and the anchor position. The user equipment then receives from the tracked device, measurement data taken by the tracked device. The absolute position and the measurement data taken by the tracked device are then used to obtain tracking data for the tracked device.

The relative position of the tracked device is first estimated from a signal received from the tracked device. The absolute position is then computed using the relative position and the position and orientation of the anchor device. The absolute position and measurements taken by the tracked device are used to obtain tracking data effectively.

According to a first implementation of the first aspect, the anchor position and the anchor orientation are determined in relation to a playing surface.

According to some examples of any preceding implementation of the first aspect or the first aspect as such, the relative position of the tracked device is estimated by measuring a Time-of-Flight (ToF) for the signal and measuring an Angle-of-Arrival (AoA) for the signal.

According to some examples of any preceding implementation of the first aspect or the first aspect as such, the signal comprises at least one of an Institute of Electrical and Electronics Engineers (IEEE) 802.11 signal, a Bluetooth Low Energy (BLE) signal, an Ultrawide Band (UWB) signal, or an Ultrasonic sign.

Different radio technologies may be used to estimate a position of the tracked device, each radio technology having its own characteristics.

According to some examples of any preceding implementation of the first aspect or the first aspect as such, the user equipment further estimates an orientation of the tracked device from the measurement data, wherein the tracking data comprises a pitch value, a roll value, and a yaw value, for a plurality of moments across time.

The measurement data received from the tracked device allows the anchor device to estimate an orientation of the tracked device. The orientation of the tracked device may be expressed in pitch, roll, and yaw.

According to some examples of any preceding implementation of the first aspect or the first aspect as such, the first anchor device is a master anchor device, and the user equipment further determines, prior to receiving the signal, a second anchor position and a second anchor orientation of a second anchor device.

In some cases, a plurality of anchor devices may be used to assist in tracking the tracked device. One anchor device is designated as the master anchor device to coordinate tracking data received. The master anchor device determines the position of the other anchor devices to allow it to properly interpret tracking data received from the other tracking devices.

According to some examples of any preceding implementation of the first aspect or the first aspect as such, the user equipment further receives second tracking data from the second anchor device, and obtains continuous tracking data based on the second tracking data and the tracking data.

Tracking data from other anchor devices is received at the master anchor device. This allows the master anchor device to have tracking data for time periods when only other anchor devices were capable of tracking the tracked device, and to increase the accuracy of the tracking data when multiple anchor devices were capable of tracking the tracked device.

According to some examples of any preceding implementation of the first aspect or the first aspect as such, the user equipment further establishes a connection with a second tracked device and receives a second signal from the second tracked device. The user equipment estimates a second relative position of the second tracked device based on the second signal, and a second absolute position of the second tracked device is computed from the second relative position of the second tracked device, the anchor orientation, and the anchor position. The user equipment then receives second measurement data from the second tracked device, the second measurement data taken by the second tracked device. Second tracking data is obtained based on the second measurement data and the second absolute position of the second tracked device.

The anchor device may therefore track the movement of multiple tracked devices.

According to some examples of any preceding implementation of the first aspect or the first aspect as such, the tracked device is associated to a first body part of a user and the second tracked device is associated to a second body part of the user.

By associating tracked devices to a body part of the user, movements of the user's body may be inferred from the tracking data.

According to some examples of any preceding implementation of the first aspect or the first aspect as such, the tracked device is associated to a first user and the second tracked device is associated to a second user.

By associating tracked devices to users, the movements of different participants in an activity may be tracked together.

In a second aspect, there is provided a user equipment for tracking a tracked device. The user equipment comprises a processor and a communications subsystem which cooperate to perform the following steps. The user equipment, acting as a first anchor device, determines an anchor position and an anchor orientation of the user equipment. The user equipment then establishes a connection with the tracked device, and receives a signal from the device. The signal is then used to estimate a relative position of the tracked device and an absolute position of the tracked device is computed from the relative position of the tracked device, the anchor orientation, and the anchor position. The user equipment then receives, from the tracked device, measurement data taken by the tracked device. The absolute position and the measurement data taken by the tracked device are then used to obtain tracking data for the tracked device.

The relative position of the tracked device is first estimated from a signal received from the tracked device. The absolute position is then computed using the relative position and the position and orientation of the anchor device. The absolute position and measurements taken by the tracked device are used to obtain tracking data.

According to a first implementation of the second aspect, the anchor position and the anchor orientation are determined in relation to a playing surface.

According to some examples of any preceding implementation of the second aspect or the second aspect as such, the relative position of the tracked device is estimated by measuring a Time-of-Flight (ToF) for the signal and measuring an Angle-of-Arrival (AoA) for the signal.

According to some examples of any preceding implementation of the second aspect or the second aspect as such, the signal comprises at least one of an Institute of Electrical and Electronics Engineers (IEEE) 802.11 signal, a Bluetooth Low Energy (BLE) signal, an Ultrawide Band (UWB) signal, or an Ultrasonic sign.

Different radio technologies may be used to estimate a position of the tracked device, each radio technology having its own characteristics.

According to some examples of any preceding implementation of the second aspect or the second aspect as such, the user equipment further estimates an orientation of the tracked device from the measurement data, wherein the tracking data comprises a pitch value, a roll value, and a yaw value, for a plurality of moments across time.

The measurement data received from the tracked device allows the anchor device to estimate an orientation of the tracked device. The orientation of the tracked device may be expressed in pitch, roll, and yaw.

According to some examples of any preceding implementation of the second aspect or the second aspect as such, the first anchor device is a master anchor device, and the user equipment further determines, prior to receiving the signal, a second anchor position and a second anchor orientation of a second anchor device.

In some cases, a plurality of anchor devices may be used to assist in tracking the tracked device. One anchor device is designated as the master anchor device to coordinate tracking data received. The master anchor device determines the position of the other anchor devices to allow it to properly interpret tracking data received from the other tracking devices.

According to some examples of any preceding implementation of the second aspect or the second aspect as such, the user equipment further receives second tracking data from the second anchor device, and obtains continuous tracking data based on the second tracking data and the tracking data.

Tracking data from other anchor devices is received at the master anchor device. This allows the master anchor device to have tracking data for time periods when only other anchor devices were capable of tracking the tracked device, and to increase the accuracy of the tracking data when multiple anchor devices were capable of tracking the tracked device.

According to some examples of any preceding implementation of the second aspect or the second aspect as such, the user equipment further establishes a connection with a second tracked device and receives a second signal from the second tracked device. The user equipment estimates a second relative position of the second tracked device based on the second signal, and a second absolute position of the second tracked device is computed from the second relative position of the second tracked device, the anchor orientation, and the anchor position. The user equipment then receives second measurement data from the second tracked device, the second measurement data taken by the second tracked device. Second tracking data is obtained based on the second measurement data and the second absolute position of the second tracked device.

The anchor device may therefore track the movement of multiple tracked devices.

According to some examples of any preceding implementation of the second aspect or the second aspect as such, the tracked device is associated to a first body part of a user and the second tracked device is associated to a second body part of the user.

By associating tracked devices to a body part of the user, movements of the user's body may be inferred from the tracking data.

According to some examples of any preceding implementation of the second aspect or the second aspect as such, the tracked device is associated to a first user and the second tracked device is associated to a second user.

By associating tracked devices to users, the movements of different participants in an activity may be tracked together.

In a third aspect, there is provided computer readable medium having stored thereon executable code for execution by a processor of a user equipment for tracking a tracked device, the executable code comprising instructions to cause the user equipment to perform the following steps. The user equipment, acting as a first anchor device, determines an anchor position and an anchor orientation of the user equipment. The user equipment then establishes a connection with the tracked device, and receives a signal from the tracked device. The signal is then used to estimate a relative position of the tracked device and an absolute position of the tracked device is computed from the relative position of the tracked device, the anchor orientation, and the anchor position. The user equipment then receives, from the tracked device, measurement data taken by the tracked device. The absolute position and the measurement data taken by the tracked device are then used to obtain tracking data for the tracked device.

According to a first implementation of the third aspect, the anchor position and the anchor orientation are determined in relation to a playing surface.

According to some examples of any preceding implementation of the third aspect or the third aspect as such, the relative position of the tracked device is estimated by measuring a Time-of-Flight (ToF) for the signal and measuring an Angle-of-Arrival (AoA) for the signal.

According to some examples of any preceding implementation of the third aspect or the third aspect as such, the signal comprises at least one of an Institute of Electrical and Electronics Engineers (IEEE) 802.11 signal, a Bluetooth Low Energy (BLE) signal, an Ultrawide Band (UWB) signal, or an Ultrasonic sign.

Different radio technologies may be used to estimate a position of the tracked device, each radio technology having its own characteristics.

According to some examples of any preceding implementation of the third aspect or the third aspect as such, the user equipment further estimates an orientation of the tracked device from the measurement data, wherein the tracking data comprises a pitch value, a roll value, and a yaw value, for a plurality of moments across time.

The measurement data received from the tracked device allows the anchor device to estimate an orientation of the tracked device. The orientation of the tracked device may be expressed in pitch, roll, and yaw.

According to some examples of any preceding implementation of the third aspect or the third aspect as such, the first anchor device is a master anchor device, and the user equipment further determines, prior to receiving the signal, a second anchor position and a second anchor orientation of a second anchor device.

In some cases, a plurality of anchor devices may be used to assist in tracking the tracked device. One anchor device is designated as the master anchor device to coordinate tracking data received. The master anchor device determines the position of the other anchor devices to allow it to properly interpret tracking data received from the other tracking devices.

According to some examples of any preceding implementation of the third aspect or the third aspect as such, the user equipment further receives second tracking data from the second anchor device, and obtains continuous tracking data based on the second tracking data and the tracking data.

Tracking data from other anchor devices is received at the master anchor device. This allows the master anchor device to have tracking data for time periods when only other anchor devices were capable of tracking the tracked device, and to increase the accuracy of the tracking data when multiple anchor devices were capable of tracking the tracked device.

According to some examples of any preceding implementation of the third aspect or the third aspect as such, the user equipment further establishes a connection with a second tracked device and receives a second signal from the second tracked device. The user equipment estimates a second relative position of the second tracked device based on the second signal, and a second absolute position of the second tracked device is computed from the second relative position of the second tracked device, the anchor orientation, and the anchor position. The user equipment then receives second measurement data from the second tracked device, the second measurement data taken by the second tracked device. Second tracking data is obtained based on the second measurement data and the second absolute position of the second tracked device.

The anchor device may therefore track the movement of multiple tracked devices.

According to some examples of any preceding implementation of the third aspect or the third aspect as such, the tracked device is associated to a first body part of a user and the second tracked device is associated to a second body part of the user.

By associating tracked devices to a body part of the user, movements of the user's body may be inferred from the tracking data.

According to some examples of any preceding implementation of the third aspect or the third aspect as such, the tracked device is associated to a first user and the second tracked device is associated to a second user.

By associating tracked devices to users, the movements of different participants in an activity may be tracked together.

BRIEF DESCRIPTION OF THE DRAWINGS

The present disclosure will be better understood with reference to the drawings in which.

DETAILED DESCRIPTION

The present disclosure is directed to providing an improved method of local tracking based on at least one anchor device and at least one tracked device. The anchor device may be a user equipment such as a smart phone, tablet, laptop computing device, desktop computing device, or the like. The device to be tracked may be a user equipment such as a smart watch, a smart band, smart earphones, smart eyeglasses, smart shoes, or other electronic devices.

A tracked device may comprise an Inertial Measurement Unit (IMU). An IMU is a device that may be integrated in an electronic device such as a tracked device, and which measures values such as specific force, angular rate, orientation, and the like. An IMU may obtain such readings from a combination of sensors such as gyroscopes, accelerometers, magnetometers, and the like. Generally, an IMU may provide readings for six different degrees of freedom, as shown with respect to FIG. 1.

Figure 1:
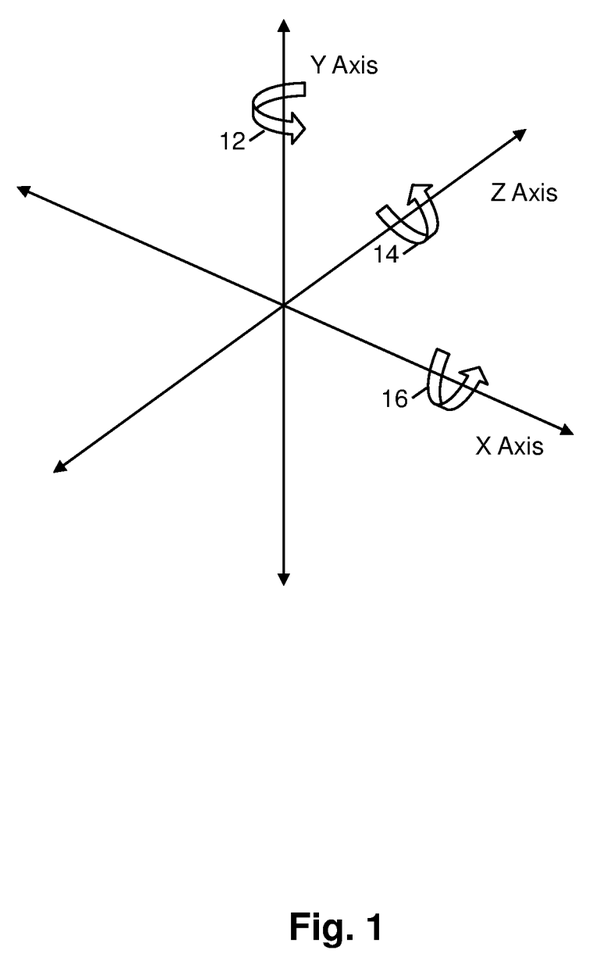
FIG. 1 is a diagram illustrating degrees of freedom for a device according to at least one embodiment of the present disclosure.

As seen in FIG. 1, a three-dimensional space is illustrated with respect to the Y axis, the X axis, and the Z axis. Each of these axes represent one degree of freedom for an object. Similarly, rotation around each axis represents a degree of freedom. Rotation around the Y axis is known as the yaw 12, rotation around the X axis is known as the pitch 16, and rotation around the Z axis is known as the roll 14.

Therefore, an IMU may provide measurements with respect to each of the X, Y, and Z axes, as well as with respect to rotation around each of the X, Y, and Z axes.

Communications between the user equipment and the tracked device may be based on different types of technologies. For example, the user equipment and the tracked device may communicate over WiFi™ or any technology based on the Institute of Electrical and Electronics Engineers (IEEE) 802.11 standard. Alternatively, the user equipment and the tracked device may communicate over Bluetooth™ or Bluetooth Low Energy (BLE), ultra-wide band (UWB), and ultrasonic technology. However, the present disclosure is not intended to be limited to any communication technology or set of communication technologies.

According to at least some embodiments of the present disclosure, a user equipment is positioned as an anchor device and receives signals over a communication technology. These signals are used to estimate a relative position of the tracked device with respect to the anchor device. By combining the relative position of the tracked device with respect to the anchor device, with the position of the anchor device, the absolute position of the tracked device may be tracked.

Specifically, the relative position between two objects may be expressed in any suitable spatial coordinate system, such as for example a three-dimensional cartesian system (x, y, z), where x and y correspond to two perpendicular axes within a plane parallel to the ground, and z corresponds to a vertical axis. This coordinate system is only presented as an example and other coordinate systems, such as radial coordinates, may also be used.

Generally, for a given absolute position P=(x,y,z) in such a coordinate system, the relative position $P_{rel}$ of an object with respect to P is obtained by $P_{rel}=P_{obj}-P=(x_{obj}-x, y_{obj}-y, z_{obj}-z)$, where $P_{obj}$ is the absolute position of the object within that coordinate system. Therefore, if the relative position $P_{rel}$ of an object is obtained from measurements taken on a signal from that object, the absolute position of the object $P_{obj}$ may be computed as $P_{obj}=P+P_{rel}=(x+x_{rel}, y+y_{rel}, z+z_{rel})$.

Therefore, an anchor device may know its own absolute position in a selected coordinate system, and a relative position of the tracked device. This allows the anchor device to compute the absolute position of the tracked device in the same selected coordinate system based on the equations above, where P is the absolute position of the anchor device, $P_{rel}$ is the relative position of the tracked device with respect to the anchor device, and $P_{obj}$ is the absolute position of the tracked device in the selected coordinate system.

The selected coordinate system may be any suitable coordinate system as discussed above. In at least one embodiment, the selected coordinate system has an origin at a specific point on the playing surface, for example the center of a basketball court, the left corner of a ping pong table, amongst others.

The anchor device may know its own position with respect to the selected coordinate system in a number of ways. For example, the anchor device may instruct the user to place the anchor device at a specific position within the playing surface. Alternatively, the anchor device may be capable of obtaining Global Positioning System (GPS) coordinates for itself, and obtain the GPS coordinates of the playing surface. Other systems than GPS may also be used.

Throughout this disclosure, the term "absolute position" will be used to denote the position of a device with respect to the selected coordinate system. The term "relative position" will be used to denote the position of a device with respect to another object.

According to at least some embodiments of the present disclosure, the signals are used to estimate the distance between the anchor device and the tracked device, as well as the direction of the tracked device from the perspective of the anchor device. The distance and the direction combined provide the relative position of the tracked device with respect to the anchor device.

According to at least some embodiments of the present disclosure, the distance is measured using the Time-of-Flight (ToF) technique. ToF is a method for measuring the distance between a sensor and an object, based on the time difference between the emission of a signal and its return to the sensor, after being reflected by the object.

According to at least some embodiments of the present disclosure, the direction is measured using the Angle-of-Arrival (AoA) technique. AoA is a method for detecting the direction a signal is coming from.

The communication technologies discussed above have different characteristics that are relevant for measuring range and direction, as shown in Table 1, below.

TABLE 1

|  | WiFi | BLE | UWB | Ultrasonic |
|---|---|---|---|---|
| Range accuracy | 1-3 m | 1-5 m (RSSI) 30-50 cm (Phase) | 3-10 cm | 5-50 cm |
| Bearing accuracy | 15° | 30° (2 antennas) | 1-3° | 10-30° |

TABLE 1-continued

| | WiFi | BLE | UWB | Ultrasonic |
|---|---|---|---|---|
| | | | 15° (3 antennas) | |
| Security | Low | Low | High | Low |
| Effective distance | 100 m | 80 m | 250 m | 20 m |
| Frequency | 2.4 G/5.8 G | 2.4 G | 3.1 G-10.6 G | 17K-20K |
| Environmental Interference | High/Medium | Medium | Low | High/Medium |
| Multipath Effect | Sensitive | Sensitive | Not Sensitive | Sensitive |
| Wall Penetration | Weak | Medium | Good | Weak |
| Delay | 3 s | 3 s | 1 ms | 3 s |

Figure 2A:
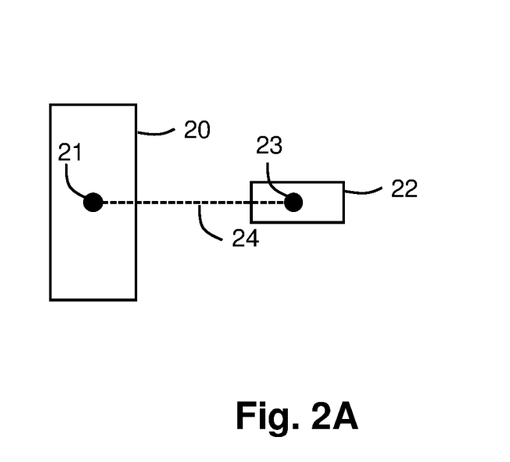
FIG. 2A is a diagram illustrating range measurement according to at least one embodiment of the present disclosure.
Figure 2B:
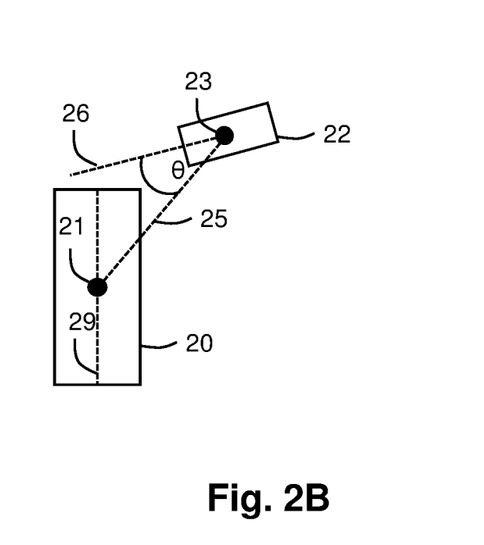
FIG. 2B is a diagram illustrating azimuth measurement according to at least one embodiment of the present disclosure.

Reference is made to FIG. 2A. From the top view, as seen in FIG. 2A the distance between an anchor device 20 and a tracked device 22 may be defined as the distance between the center 21 of the anchor device 20 and the center 23 of the tracked device 22. Also from the top view, as seen in FIG. 2B, the azimuth may be defined as the angle θ between a line 25 joining the center 21 of the anchor device 20 and the center 23 of the tracked device 22, and a line 26 extending from the center 23 of the tracked device 22 along an axis of the tracked device 22.

Figure 2C:
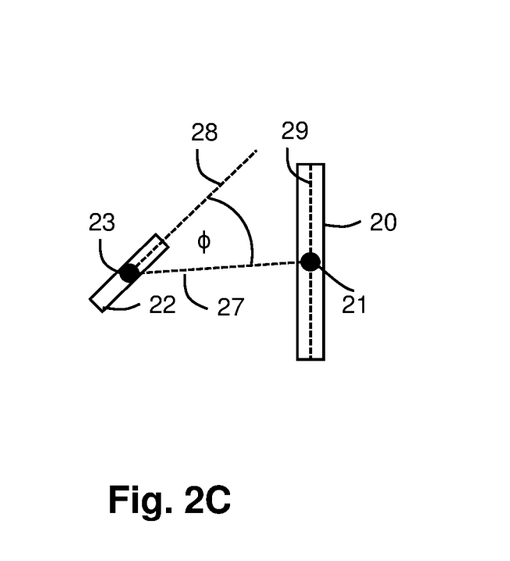
FIG. 2C is a diagram illustrating pitch measurement according to at least one embodiment of the present disclosure.

FIG. 2C shows a side view of the anchor device 20 and the tracked device 22. The pitch may be defined as the angle φ between a line 27 joining center 21 of anchor device 20 and center 23 of tracked device 22, and a line 28 extending from center 23 of tracked device 22 along an axis of tracked device 22.

The present disclosure provides an improved method for local tracking of objects using only an anchor device and a tracked device. The anchor device may be a user equipment such as a smart phone, a tablet, or a laptop computing device having the capacity to receive signals using at least one suitable communication technology. The tracked device may be a user equipment such as an electronic device that is worn on a user's body. For example, the tracked device may be a smart watch, a smart band, at least one earphone, etc. However, the present disclosure is not intended to be limited in that respect.

The anchor device is placed in a known location and receives signals from the tracked device as the tracked device moves along with the wearer of the tracked device. This way the anchor device may track the movements of the tracked device with respect to its own position. The anchor device then uses knowledge of its own position to determine the absolute position of the tracked device across time.

According to at least some embodiments of the present disclosure, multiple anchor devices are used. Each of the multiple anchor devices may receive a signal from the tracked device and determine the relative position of the tracked device at a given time and compute the absolute position of the tracked device. A master anchor device may be designated to coordinate the data received from each of the anchor devices. By assigning a section of the playing area to each of the multiple anchor devices, tracking over a larger area may be achieved. When only one anchor device is used, the one anchor device is the master anchor device.

According to at least some embodiments of the present disclosure, the tracked device comprises an IMU which measures values such as specific force, angular rate, orientation, and the like. The tracked device may communicate such measurements to an anchor device in order to provide close-range relative movement information. The anchor device may combine such close-range movement information with relative position information determined based on measurements such as ToF and AoA from the tracked device's signal and the anchor device's absolute position to track the tracked device's absolute position.

Figure 3:
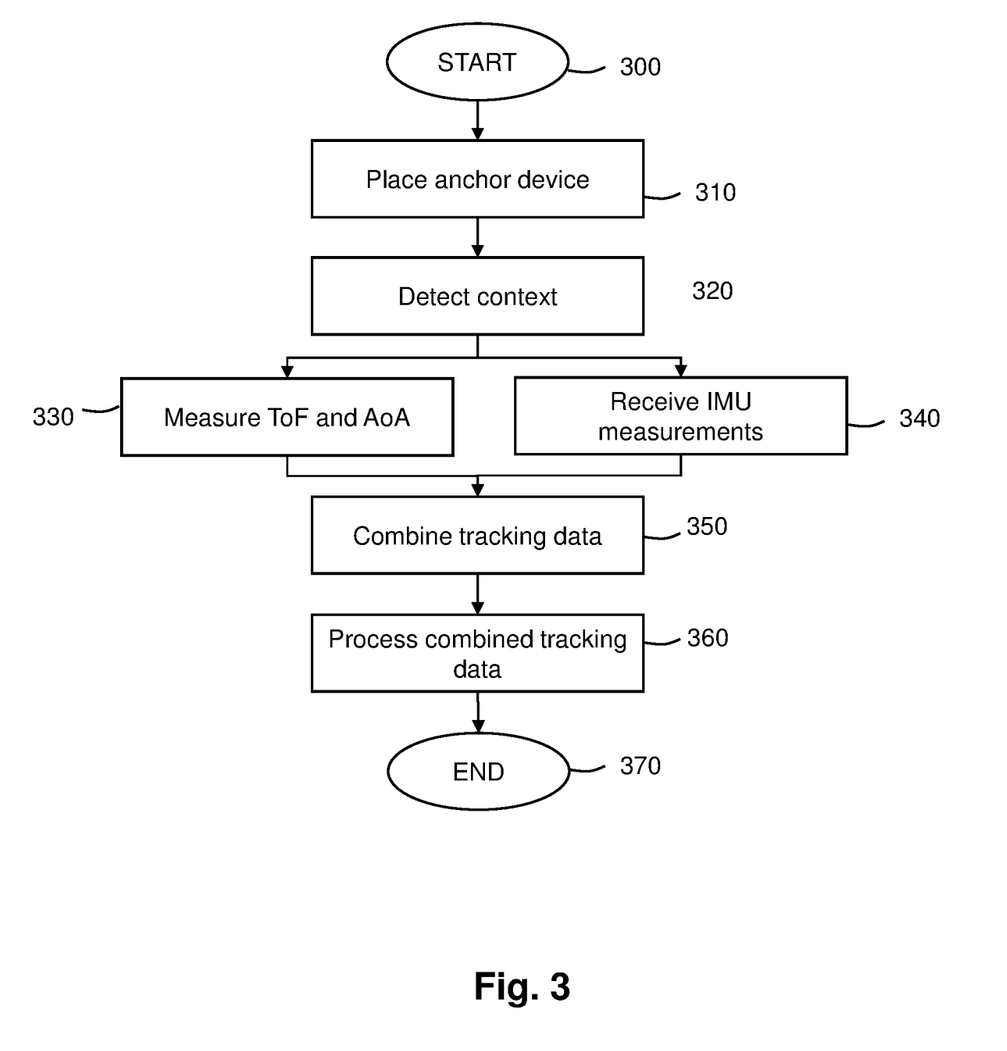
FIG. 3 is a flow diagram illustrating a method for tracking a device according to at least one embodiment of the present disclosure.

Reference is now made to FIG. 3, which illustrates a method for tracking an object according to at least one embodiment of the present disclosure. The tracked object may be for example, a ping pong paddle. The ping pong paddle may be tracked by virtue of being in the hand of a person wearing a smart watch, for example. Other possibilities are contemplated and this is provided merely as an example.

The method of FIG. 3 starts at block 300 and proceeds to block 310 where the anchor device is placed at a known location. For example, when the tracked object is a ping pong paddle, the anchor device may be placed at a fixed spot near the ping pong table.

Where the playing surface is larger than the capability range of the anchor device, several anchor devices may be placed at fixed locations around the playing surface.

The method then proceeds to block 320 where the context is detected. The context may comprise any activity related setting and any environment related setting required for the anchor device to properly track the movement of the tracked device. According to at least some embodiments, context detection may involve determining a sport for which an object is tracked (e.g., ping pong), the position and orientation of the anchor device with respect to the playing surface, the position and orientation of other anchor devices (if any), information identifying the tracked device, and communication capabilities of the tracked device, for example.

According to at least some embodiments of the present disclosure, a communication link is established between the anchor device and the tracked device. In the case of multiple anchor devices, a communication link may be established between each of the multiple anchor devices and a selected master anchor device, and between each of the multiple anchor devices and the tracked device.

The communication technology used for establishing a communication link between an anchor device and a tracked device may be WiFi™, BLE, UWB, or Ultrasonic, amongst others.

The communication technology used for establishing a communication link between an anchor device and the selected master anchor device maybe any suitable technology used to exchange data between user devices, such as cellular networks, near-field communications, WLANs, device-to-device networks, amongst others.

The method then proceeds to blocks 330 and 340 where tracking data is received from tracked devices. The data received from tracked devices may include direct measurements of the distance and the bearing, such as for example ToF and AoA measurements. The data received from tracked devices may include measurements taken by the tracked devices, such as for example measurements of IMUs of the tracked devices like specific force, angular rate, and orientation, amongst others.

According to at least some embodiments, the measurement data from the tracked device is transmitted to the anchor device using a different communication technology, such as for example cellular networks, near-field communications, WLANs, device-to-device networks, amongst others.

The measurements taken by the tracked device allow to estimate local movements such as displacements or rotations which are not captured by direct signal measurements like ToF and AoA.

At block 330, direct signal measurements are made. According to at least one embodiment, ToF and AoA is measured. The ToF and AoA may be measured on an UWB signal, a BLE signal, a WiFi™ signal, or an Ultrasonic signal, amongst others. With the known position and orientation of an anchor device, the ToF and AoA measurements of the signal transmitted by the tracked device may be used to estimate the position of the tracked device.

According to at least some embodiments of the present disclosure, when the signal to noise ratio of a signal is too poor in order to make sufficiently accurate measurements, the signal may be ignored, and another anchor device receiving a better signal may take measurements. When an anchor device which is not a master anchor device measures ToF and AoA for a signal, that anchor device may transmit the measurements to the master anchor device.

At block 340, measurements taken by the tracked device are received at an anchor device. These measurements may be taken by an IMU of the tracked device and may include values such as specific force, angular rate, and orientation. The measurements may include measurements for six degrees of freedom, namely for the X, Y, and Z axes, and for pitch, yaw, and roll.

The measurements taken by the tracked device may then be transmitted to the master anchor device, if there are multiple anchor devices. The master anchor device may then use these measurements to estimate the local movements, including rotational movements, of the tracked device and of the tracked object associated to the tracked device.

Therefore, the master anchor device obtains both direct measurements from the signal to estimate the relative position of the tracked device with respect to itself, and measurements taken by the tracked device to estimate local movements of the tracked device.

The method then proceeds to block 350 where the tracking data is combined. Specifically, direct signal measurements and measurements taken by the tracked device are combined to estimate the absolute position and orientation of the tracked device and the associated tracked object at different moments across time.

The method then proceeds to block 360 where the combined tracking data may be processed. For example, the combined tracking data may be displayed on a display, an animation based on the tracking data may be rendered and shown on the display, the combined tracking data may be analyzed for determination of performance metrics and for injury prevention, amongst others. According to at least some embodiments, the combined tracking data is simply stored on the master anchor device or transmitted to a remote storage device using a network connection.

Once the tracking data has been processed, the method proceeds to block 370 and ends.

The method illustrated in FIG. 3 may be performed for multiple tracked devices simultaneously.

Figure 4:
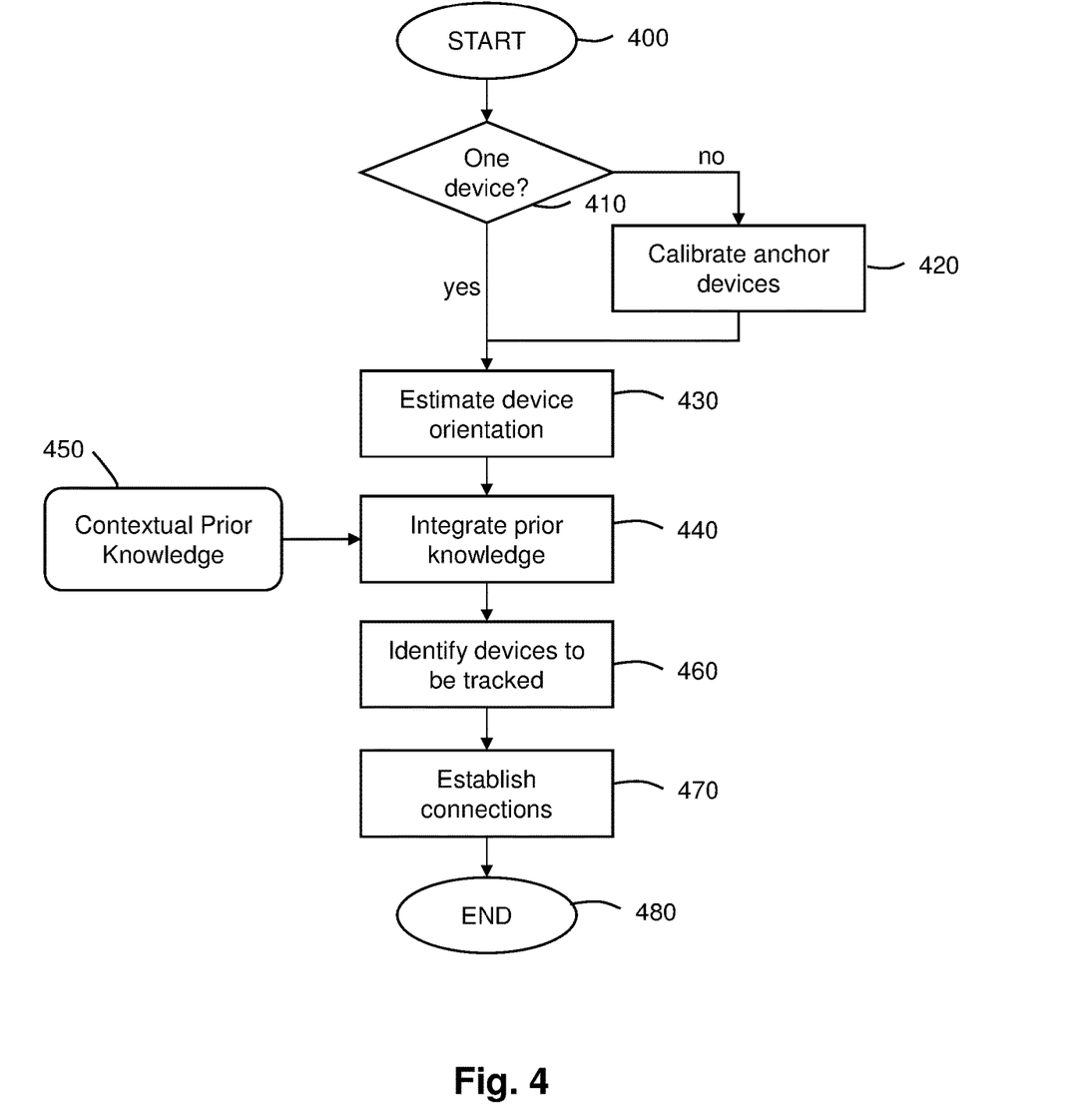
FIG. 4 is a flow diagram illustrating a method for initiating a system for tracking devices according to at least one embodiment of the present disclosure.

Reference is now made to FIG. 4 which illustrates the context detection in greater detail, according to at least some embodiments of the present disclosure.

The method starts at block 400 and proceeds to block 410 where an anchor device determines whether there is only one anchor device or multiple anchor devices. For example, the anchor device may attempt to listen for other devices on a reserved channel and detect other anchor devices who are broadcasting their presence. The anchor device may also broadcast its presence on a reserved channel for other anchor devices to detect. The presence of other anchor devices may also be performed by a user entering information on a user interface of the anchor device.

If there are more than one anchor device, the method proceeds to block 420 where the position of other anchor devices is determined. For example, the anchor device may measure a ToF and an AoA from each other anchor device. Alternatively, the other anchor devices may determine their own position and transmit that information to the master anchor device. In some embodiments, the other anchor devices may determine their GPS coordinates and transmit their GPS coordinates to each other. Alternatively, the other anchor devices may instruct the user to place the other anchor devices at specific locations on or near the playing surface.

After block 420, or if there is only one anchor device, the method proceeds to block 430 to measure the orientation of the anchor device. For example, the anchor device may take a reading of forces acting on it from its own IMU and determine its own orientation. If there are multiple anchor devices, each anchor device determines its own orientation and provides this information to the master anchor device.

The method then proceeds to block 440 where contextual prior knowledge 450 is integrated with the device calibration. Contextual prior knowledge 450 may comprise for example playing surface dimensions, number of players, and frequent movements for various sports, like ping pong, tennis, badminton, squash, basketball, soccer, amongst others. Contextual prior knowledge 450 may also comprise anchor device positions for various sports.

According to at least some embodiments of the present disclosure, a user may select a sport from a user interface of the anchor device, and the anchor device loads the relevant contextual prior knowledge data for that sport. The relevant contextual prior knowledge data may be stored on the anchor device itself or it may be stored remotely and accessed as needed.

By combining the contextual prior knowledge data and the absolute or relative position of all anchor devices, the master anchor device may know the position of the playing surface with respect to itself, and the relative position of every other anchor device, if any.

The method then proceeds to block 460, where tracked devices are identified. The tracked devices may be identified by listening on a reserved channel for a broadcast signal, or other known means of connecting devices wirelessly. Once a device is identified as a tracked device, the anchor device may begin tracking movements of the tracked device as discussed herein.

In the case where there are multiple anchor devices, each anchor device establishes a connection with each tracked device using a communication technology from which range and bearing measurements like ToF and AoA may be performed. For example, the communication technology may be WiFi™, BLE, UWB, or Ultrasonic, amongst others.

Figure 5:
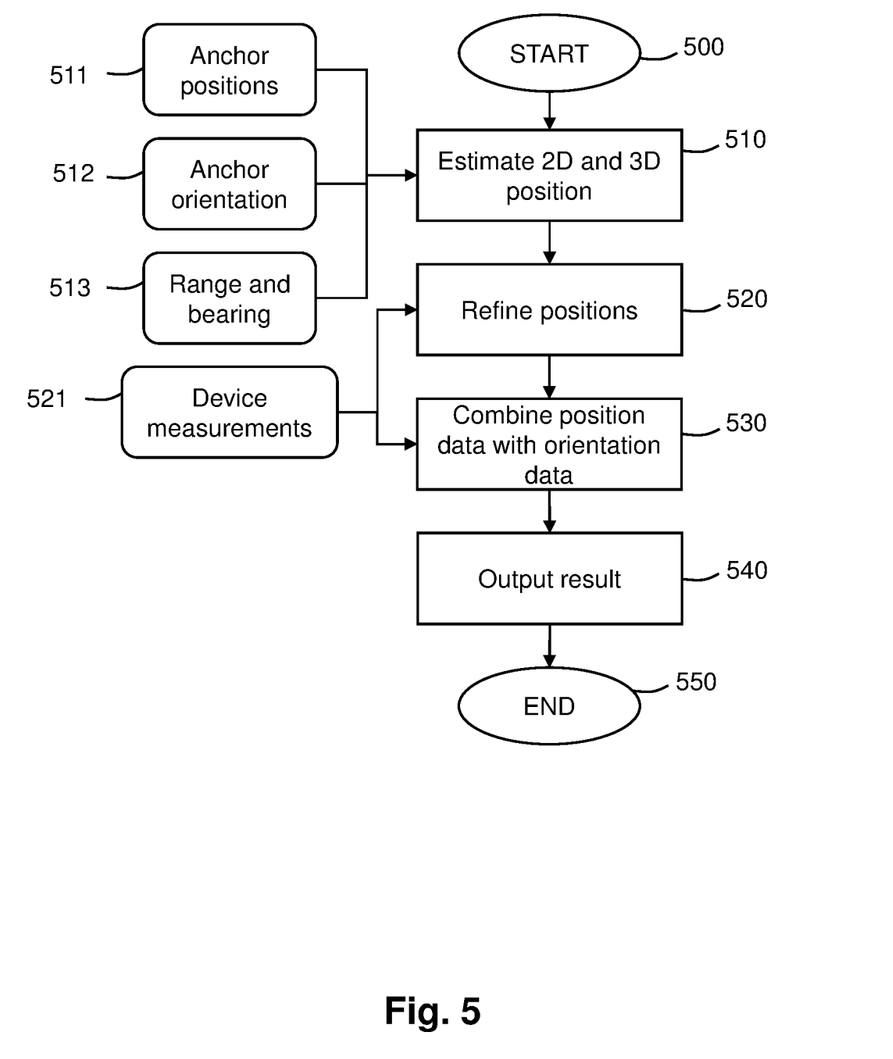
FIG. 5 is a flow diagram illustrating a method for processing tracking data according to at least one embodiment of the present disclosure.

Reference is now made to FIG. 5 which illustrates in detail how tracking of tracked devices may be performed according to at least one embodiment of the present disclosure.

The method starts at block 500 and proceeds to block 510 where a two-dimensional absolute position and a three-dimensional absolute position of the tracked device is estimated. For example, a two-dimensional absolute position comprising a position on a horizontal plane corresponding to the playing surface may be estimated from the direct signal measurements such as ToF and AoA. Similarly, a three-dimensional absolute position, comprising the two-dimensional absolute position as well as an elevation (e.g., the position on the Z axis) may be estimated. Techniques for estimating the two-dimensional absolute position and the three-dimensional absolute position may comprise triangulation and least-squares, however other techniques are contemplated to be within the scope of the present disclosure.

The two-dimensional and the three-dimensional absolute positions are computed from data that was determined during the configuration of the system, such as anchor absolute positions 511, anchor orientations 512, and from data received during tracking, such as range and bearing data 513.

According to at least some embodiments, the two-dimensional and the three-dimensional absolute positions may be estimated in real time.

The method then proceeds to block 520 where the position information is refined. Specifically, block 520 considers measurements 521 transmitted by the tracked device taken by the tracked device's IMU. These measurements provide additional information on the orientation and forces experienced by the tracked device. For example, the IMU measurements may indicate that the tracked device is moving in a given direction at a given speed. With this information the master anchor device may refine the positions evaluated in block 510. Therefore, the absolute position of the tracked device may be estimated with greater accuracy by combining the IMU measurements from the tracked device with the absolute position estimations computed in block 510.

The absolute position estimations may further be refined using information from other anchor devices. For example, the master anchor device may have tracking data for the tracked device from time To to time T1, and another anchor device may have tracking data for the tracked device from time (T1–N) and (T1+M). Therefore, for the time period from (T1–N) to T1, the master anchor device may have tracking data from multiple anchors. Tracking data from multiple anchors may be combined to increase accuracy of the tracking.

The master anchor device may further combine all data from other anchor devices, in order to have tracking data for the entire relevant time period.

The tracking data may be combined using techniques such as Kalman filtering or particle filtering, amongst others.

According to at least some embodiments of the present disclosure, the method then proceeds to block 530 where the absolute position information is combined with orientation data measured from the tracked device's IMU.

At block 540, the tracking data comprising three-dimensional spatial coordinates (x, y, z) and three-dimensional rotation coordinates (pitch, yaw, roll) is output. The method then ends at block 550.

In at least one embodiment, the above-described methods may be performed with a user lifting weights. In this example, only one anchor device is used, and only one tracked device is used. The tracked device may be worn, for example, as a watch on the user's wrist, however other types of tracked devices may also be used. The anchor device may be the user's smart phone.

The user may enter relevant contextual information in the smart phone. For example, the user may select weight training as the exercise to be tracked, enter the weight to be lifted, and place the smart phone on the floor next to the exercise area. The user may also connect his watch to the smart phone and identify the watch as a tracked device.

As the user lifts the weights up and down, the movement of the watch is tracked by the anchor device across time. The user may then review his movements later on in order to correct any issues that may be identified. For example, the user may find issues with his wrist angle, with the trajectory of the movement, or whether the speed of the movement is as expected.

In at least another embodiment of the present disclosure, the above-described method may be performed with a game of basketball. In this example, four anchor devices are placed at each corner of a half-court, and a user who wishes his movements tracked may wear a smart watch as a tracked device.

The user may enter relevant contextual information in the smart phone. For example, the user may select basketball as the exercise to be tracked, select a half-court option as the playing surface, and place four smart phones on each corner of the half-court. In one embodiment, the user may be instructed, for example by an application running on one smart phone, to place all anchor devices at each corner. The user may also connect his watch to each anchor device and identify the watch as a tracked device.

The master anchor device may then ensure communications with each anchor device is established, establish a connection with the smart watch, and mark the smart watch as a tracked device. Information about the smart watch may be provided to the other anchor devices. Alternatively, or in combination, the other anchor devices may establish a connection with the smart watch and mark the smart watch as a tracked device.

Once all devices are connected with each other, calibration of the system may occur. For example, the position of the master anchor device may be determined. The master anchor device may also confirm that the other anchor devices are positioned and oriented as suggested for the selected sport, which in this example is a basketball game on a half-court. An initial position and orientation of the tracked device may also be estimated.

Each anchor device may then begin receiving data from the tracked device. The data may be in the form of ToF measurements, AoA measurements, and IMU measurements taken by an IMU of the tracked device. The master anchor device may then combine these measurements in order to create a three-dimensional or six-dimensional model of the tracked device's movement.

Specifically, as discussed above, in the case of a large playing area like a half-basketball court, a single anchor device may be insufficient to track the tracked device across the entire playing area. Therefore, in some embodiments, multiple anchor devices are placed around the playing area so as to provide sufficient coverage to the entire playing area. Each anchor device may track the tracked device while the tracked device is in range of an anchor device. Therefore, each anchor device may have some tracking data for some time periods, and no tracking data for other time periods. All the tracking data is received by the master anchor device which combines such data to create continuous tracking data. When tracking data for a given time period is received from multiple anchor devices, such tracking data may be combined to provide greater accuracy.

The user may then review and analyze his performance by displaying the tracking data on a display of a computing device.

In at least another embodiment of the present disclosure, the above-described method may be performed with a game of ping-pong. In this example, two anchor devices are placed near the ping-pong table. For example, on anchor device is placed on the floor, and another anchor device is placed underneath the table at a corner, and each ping pong player wears a smart watch as a tracked device, as well as smart earphones as a further tracked device.

Figure 6:
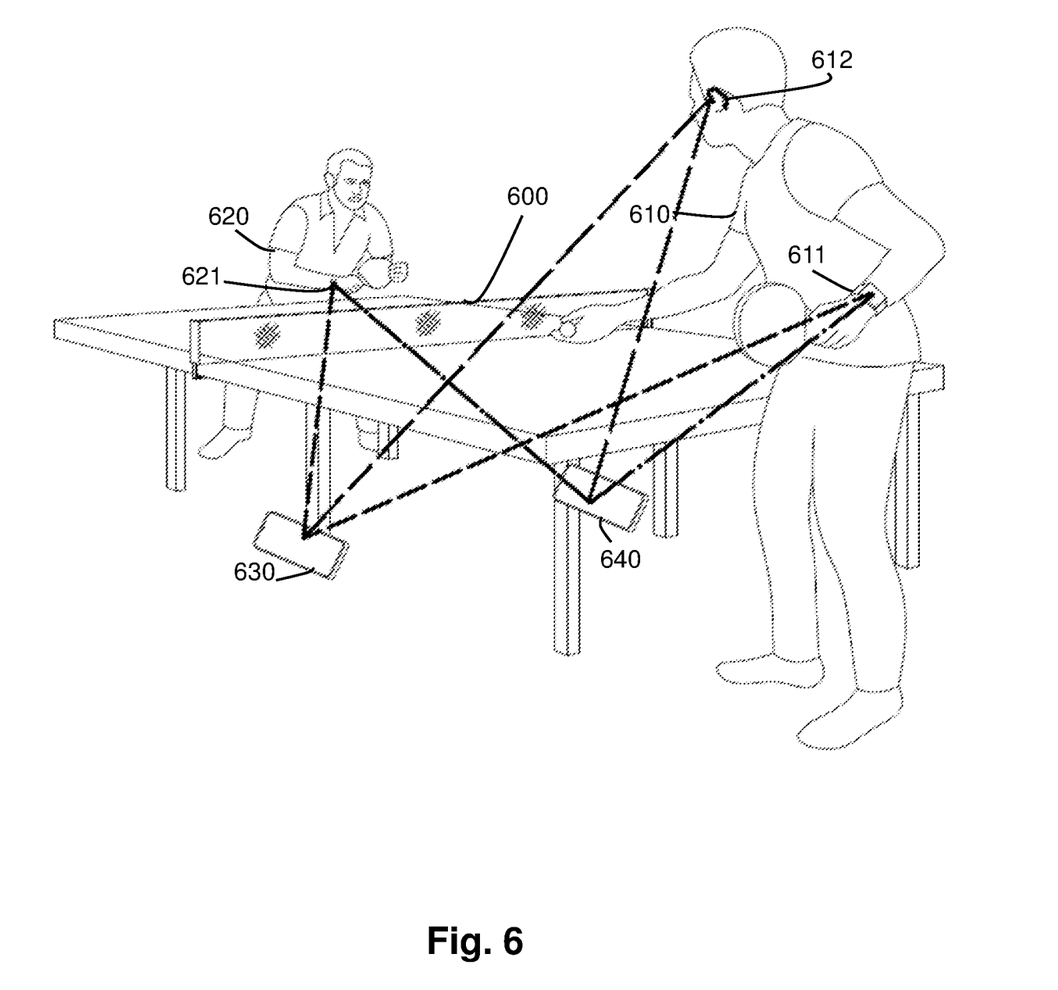
FIG. 6 is an illustration of a method according to the present disclosure being performed on a ping pong table.

Reference is made to FIG. 6, which illustrates the above scenario. Specifically, as seen in FIG. 6, a game of ping pong is being placed by user 610 and user 620 on a ping pong table 600. Anchor device 630 is placed at the bottom of a middle leg of ping pong table 600, and anchor device 640 is placed below a corner of ping pong table 600. However, anchor devices 630 and 640 may be placed at other locations, and the present is not limited in this respect. As illustrated in FIG. 6, anchor devices 630 and 640 are smart phones.

User 610 wears a smart watch which acts as tracked device 611, as well as smart headphones which act as tracked device 612. User 620 wears a smart watch which acts as tracked device 621. As can be seen from FIG. 6, users 610 and 620 are both right-handed, and therefore hold their ping pong paddle on their right hands, and also wear tracked devices 611 and 621 on their right hands. By wearing the tracked device on the same hand that is used to hold the ping pong paddle, the tracked movement will closely match the movement of the ping pong paddle. Each of tracked devices 611, 612, and 621 may communicate wirelessly with each of anchor devices 630 and 640.

Prior to starting the game, one of users 610 or 620 may enter relevant contextual information in one of anchor devices 630 or 640. For example, the user may select ping-pong as the exercise to be tracked, and select a standard ping-pong table as the playing area. The user may then be instructed to place the anchor devices at specific locations, for example on the floor underneath the net, and underneath the table at a corner, as seen in FIG. 6.

When the anchor devices 630 and 640 are placed at the designated locations, the anchor devices 630 and 640 may perform contextual detection. Specifically, the master anchor device may be selected, either by a user or by the anchor devices themselves, or based on location, and establish connections between each anchor device 630 and 640, and between each anchor device 630 and 640 and each tracked device 611, 612 and 621. The tracked devices 611, 612, and 621 may also be marked as tracked devices by the anchor devices 630 and 640. According to at least some embodiments of the present disclosure, the user may specify on what part of the body the tracked device is worn. For example, in the example of FIG. 6 the body part associated to tracked devices 611 and 621 may be the right hand, and the body part associated to tracked devices 612 may be the head. In other cases, the tracked device may identify its type to the anchor device upon connecting to the anchor device. For example, the tracked device may identify itself as smart headphones, allowing the anchor device to know that they are worn on the head of the user.

The tracked devices 611 and 621 may also be grouped by user. In the example of FIG. 6, tracked devices 611 and 612 are associated to user 610, and tracked device 621 is associated to user 620. Accordingly, each user may have multiple tracked devices associated to them. Specifically, the smart watch and the smart earphone of one player may be grouped together and both be associated to the same user.

Once the devices are connected to each other, the system may perform calibration and verify the position and orientation of each anchor device.

During the game, the anchor devices 630 and 640 may track the movement of each tracked device. Specifically, in the example of FIG. 6, anchor devices 630 and 640 may track the movements of tracked devices 611, 612, and 621.

The tracking data is then combined to produce movement data across time for each tracked device. In the above scenario, the smart watch data corresponds to the hand of a user and the smart earphone data corresponds to the head of the user.

Accordingly, complex movements involving multiple body parts may also be tracked by systems and methods according to the present disclosure. Furthermore, movements of different users may be tracked by systems and methods according to the present disclosure.

Figure 7:
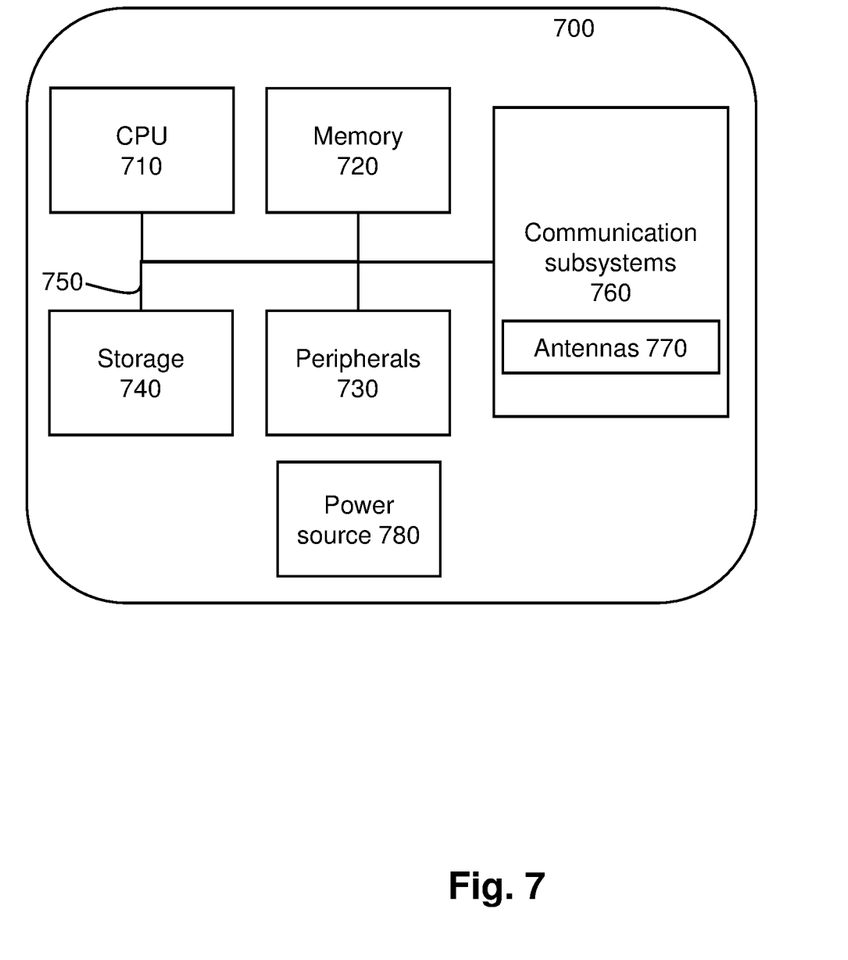
FIG. 7 is a block representation of an anchor device according to at least one embodiment of the present disclosure.

The above functionality may be implemented on any one or combination of computing devices. FIG. 7 is a block diagram of a device 700 that may be used for implementing the devices and methods disclosed herein. Device 700 may be representative of both an anchor device and a tracked device, according to at least some embodiments of the present disclosure. Specific devices may utilize all of the components shown, or only a subset of the components, and levels of integration may vary from device to device. Furthermore, a device may contain multiple instances of a component, such as multiple processing units, processors, memories, transmitters, receivers, etc.

The computing device 700 may comprise a central processing unit (CPU) 710, memory 720, a storage device 740, and peripherals 730. Peripherals 730 may comprise, amongst others one or more input/output devices, such as a speaker, microphone, mouse, touchscreen, keypad, keyboard, printer, display, network interfaces, and the like. Communications between CPU 710, memory 720, mass storage device 740, and peripherals 730 may occur through one or more buses 750.

Peripherals 730 may further comprise an Inertial Measurement Unit (IMU) for measuring forces experienced by anchor device 700. The IMU may make measurements such as specific force, angular rate, orientation, and the like.

Peripherals 730 may further comprise a positioning system such as a Global Position System (GPS) or the like.

Device 700 further comprises a power source 780, such as for example a battery.

The bus 750 may be one or more of any type of several bus architectures including a memory bus or memory controller, a peripheral bus, video bus, or the like. The CPU 710 may comprise any type of electronic data processor. The memory 720 may comprise any type of system memory such as static random access memory (SRAM), dynamic random access memory (DRAM), synchronous DRAM (SDRAM), read-only memory (ROM), a combination thereof, or the like. In an embodiment, the memory 720 may include ROM for use at boot-up, and DRAM for program and data storage for use while executing programs.

The mass storage device 740 may comprise any type of storage device configured to store data, programs, and other information and to make the data, programs, and other information accessible via the bus. The mass storage device 740 may comprise, for example, one or more of a solid state drive, hard disk drive, a magnetic disk drive, an optical disk drive, or the like.

The computing device 700 may also include one or more communication subsystems 760 for communications across various networks. Communication subsystems 760 may comprise network interfaces, which may comprise wired links, such as an Ethernet port, a Universal Standard Bus (USB) port, or the like. Communication subsystems 760 further comprise antennas 770 for communicating across wireless links. Communication subsystems 760 allow the CPU 710 to communicate with remote units directly or via the networks. Antennas 770 may comprise one or more transmitter antennas and one or more receiver antennas. In an embodiment, the processing unit is coupled to a local-area network or a wide-area network, for data processing and communications with remote devices, such as other processing units, the Internet, remote storage facilities, or the like.

Antennas 770 may further comprise antennas for communicating using at least one of an IEEE 802.11 standard or WiFi™, Bluetooth™ Low Energy, Ultrawide Band (UWB), or Ultrasonic technologies.

Through the descriptions of the preceding embodiments, the teachings of the present disclosure may be implemented by using hardware only or by using a combination of software and hardware. Software or other computer executable instructions for implementing one or more embodiments, or one or more portions thereof, may be stored on any suitable computer readable storage medium. The computer readable storage medium may be a tangible or in transitory/non-transitory medium such as optical (e.g., CD, DVD, Blu-Ray, etc.), magnetic, hard disk, volatile or non-volatile, solid state, or any other type of storage medium known in the art.

Additional features and advantages of the present disclosure will be appreciated by those skilled in the art.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

Moreover, the previous detailed description is provided to enable any person skilled in the art to make or use one or more embodiments according to the present disclosure. Various modifications to those embodiments will be readily apparent to those skilled in the art, and the generic principles defined herein may be applied to other embodiments without departing from the spirit or scope of the teachings provided herein. Thus, the present methods, systems, and or devices are not intended to be limited to the embodiments disclosed herein. The scope of the claims should not be limited by these embodiments, but should be given the broadest interpretation consistent with the description as a whole. Reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims.

Furthermore, nothing herein is intended as an admission of prior art or of common general knowledge. Furthermore, citation or identification of any document in this application is not an admission that such document is available as prior art, or that any reference forms a part of the common general knowledge in the art. Moreover, nothing disclosed herein is intended to be dedicated to the public regardless of whether such disclosure is explicitly recited in the claims.

The invention claimed is:

1. A method for tracking a tracked device, comprising:
   determining contextual information, the contextual information including an anchor position and an anchor orientation of a user equipment acting as a first anchor device, the contextual information further including activity information corresponding an activity performed by a user of the tracked device;
   establishing, at the first anchor device, a connection with the tracked device;
   receiving a signal from the tracked device to estimate a relative position of the tracked device with respect to the first anchor device based on the signal;
   computing an absolute position of the tracked device from the relative position of the tracked device, the anchor orientation, the anchor position, and the activity information;
   receiving, from the tracked device, measurement data taken by the tracked device; and
   obtaining tracking data for the tracked device based on the measurement data and the absolute position of the tracked device.

2. The method of claim 1, wherein the anchor position and the anchor orientation are determined in relation to a playing surface.

3. The method of claim 1, wherein estimating the relative position of the tracked device based on the signal comprises:
   measuring a Time-of-Flight (ToF) for the signal; and
   measuring an Angle-of-Arrival (AoA) for the signal.

4. The method of claim 1, further comprising:
   estimating an orientation of the tracked device from the measurement data, and wherein the tracking data comprises a pitch value, a roll value, and a yaw value, for a plurality of moments across time.

5. The method of claim 1, wherein the first anchor device is a master anchor device, the method further comprising, prior to receiving the signal from the tracked device, obtaining a second anchor position and a second anchor orientation of a second anchor device.

6. The method of claim 5, further comprising:
   receiving second tracking data from the second anchor device; and
   obtaining continuous tracking data based on the second tracking data and the tracking data.

7. The method of claim 1, further comprising:
   establishing, at the first anchor device, a second connection with a second tracked device; receiving a second signal from the second tracked device to estimate a second relative position of the second tracked device based on the second signal;
   computing a second absolute position of the second tracked device from the second relative position of the second tracked device, the anchor orientation, and the anchor position;
   receiving second measurement data from the second tracked device, the second measurement data taken by the second tracked device; and
   obtaining second tracking data for the second tracked device based on the second measurement data and the second absolute position of the second tracked device.

8. The method of claim 7, wherein the tracked device is associated to a first body part of the user and the second tracked device is associated to a second body part of the user.

9. The method of claim 7, wherein the second tracked device is associated to a second user.

10. A user equipment for tracking a tracked device, comprising:
    at least one processor; and
    a communications subsystem;
    wherein the at least one processor and the communications subsystem cooperate to cause the user equipment to perform operations including:

determining contextual information, the contextual information including an anchor position and an anchor orientation of the user equipment, the user equipment acting a first anchor device, the contextual information further including activity information corresponding an activity performed by a user of the tracked device;

establishing a connection with the tracked device;

receiving a signal from the tracked device to estimate a relative position of the tracked device with respect to the first anchor device based on the signal;

computing an absolute position of the tracked device from the relative position of the tracked device, the anchor orientation, the anchor position, and the activity information;

receiving, from the tracked device, measurement data taken by the tracked device; and obtaining tracking data for the tracked device based on the measurement data and the absolute position of the tracked device.

11. The user equipment of claim 10, wherein the anchor position and the anchor orientation are determined in relation to a playing surface.

12. The user equipment of claim 10, wherein estimating the relative position of the tracked device based on the signal comprises:
measuring a Time-of-Flight (ToF) for the signal; and
measuring an Angle-of-Arrival (AoA) for the signal.

13. The user equipment of claim 12, wherein the signal comprises at least one of an Institute of Electrical and Electronics Engineers (IEEE) 802.11 signal, a Bluetooth Low Energy (BLE) signal, an Ultrawide Band (UWB) signal, or an Ultrasonic signal.

14. The user equipment of claim 10, the operations further comprising:
estimating an orientation of the tracked device from the measurement data, and wherein the tracking data comprises a pitch value, a roll value, and a yaw value, for a plurality of moments across time.

15. The user equipment of claim 10, wherein the first anchor device is a master anchor device, and wherein the processor and the communications subsystem are further configured to, prior to receiving the signal from the tracked device, determine a second anchor position and a second anchor orientation of a second anchor device.

16. The user equipment of claim 15, the operations further comprising:
receiving second tracking data from the second anchor device; and
obtaining continuous tracking data based on the second tracking data and the tracking data.

17. The user equipment of claim 10, the operations further comprising:
establishing a second connection with a second tracked device;
receiving a second signal from the second tracked device to estimate a second relative position of the second tracked device based on the second signal;
computing a second absolute position of the second tracked device from the second relative position of the second tracked device, the anchor orientation, and the anchor position;
receiving second measurement data from the second tracked device, the second measurement data taken by the second tracked device; and
obtaining second tracking data for the second tracked device based on the second measurement data and the second absolute position of the second tracked device.

18. The user equipment of claim 17, wherein the tracked device is associated to a first body part of the user and the second tracked device is associated to a second body part of the user.

19. The user equipment of claim 17, wherein the second tracked device is associated to a second user.

20. A non-transitory computer readable medium having stored thereon executable code for execution by a user equipment for tracking a tracked device, the executable code comprising instructions to cause the user equipment to perform operations including:
determining contextual information, the contextual information including an anchor position and an anchor orientation of the user equipment, the user equipment acting as a first anchor device, the contextual information further including activity information corresponding an activity performed by a user of the tracked device;
establishing a connection with the tracked device;
receiving a signal from the tracked device to estimate a relative position of the tracked device with respect to the first anchor device based on the signal;
computing an absolute position of the tracked device from the relative position of the tracked device, the anchor orientation, the anchor position, and the activity information;
receiving, from the tracked device, measurement data taken by the tracked device; and
obtaining a tracking data for the tracked device based on the measurement data and the absolute position of the tracked device.

21. The method of claim 1, wherein the activity includes a sport performed by the user, the method further comprising:
determining a playing surface based on the activity information, the playing surface corresponds to a coordinate system with respect to the absolute position of the tracked device.

* * * * *